United States Patent
Liao et al.

(10) Patent No.: US 7,940,999 B2
(45) Date of Patent: May 10, 2011

(54) SYSTEM AND METHOD FOR LEARNING-BASED 2D/3D RIGID REGISTRATION FOR IMAGE-GUIDED SURGERY USING JENSEN-SHANNON DIVERGENCE

(75) Inventors: Rui Liao, Plainsboro, NJ (US);
 Christoph Guetter, Princeton, NJ (US);
 Chenyang Xu, Allentown, NJ (US);
 Yiyong Sun, Lawrenceville, NJ (US);
 Ali Khamene, Princeton, NJ (US);
 Frank Sauer, Princeton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1090 days.

(21) Appl. No.: 11/686,533

(22) Filed: Mar. 15, 2007

(65) Prior Publication Data
US 2007/0248251 A1    Oct. 25, 2007

Related U.S. Application Data

(60) Provisional application No. 60/794,805, filed on Apr. 24, 2006.

(51) Int. Cl.
 *G06K 9/00* (2006.01)
 *G06K 9/32* (2006.01)
 *G06K 9/62* (2006.01)

(52) U.S. Cl. ........ 382/294; 382/295; 382/128; 382/154; 382/160

(58) Field of Classification Search .................. None
 See application file for complete search history.

(56) References Cited

U.S. PATENT DOCUMENTS

| | | | |
|---|---|---|---|
| 6,266,453 B1 * | 7/2001 | Hibbard et al. | 382/294 |
| 7,653,264 B2 * | 1/2010 | Hero et al. | 382/294 |
| 2008/0049994 A1 * | 2/2008 | Rognin et al. | 382/128 |

* cited by examiner

*Primary Examiner* — Tom Y Lu
*Assistant Examiner* — Thomas A Conway
(74) *Attorney, Agent, or Firm* — Donald B. Paschburg; F. Chau & Associates, LLC

(57) ABSTRACT

A method of registering 3-dimensional digitized images to 2-dimensional digitized images during a medical procedure includes providing a pair of correctly-registered training images $L=\{l_r, l_f\}$ and their joint intensity distribution $p_t(i_r, i_f)$, wherein $i_r$ and $i_f$ are reference and floating images, respectively, providing a pair of observed images $O=\{o_r, o_f\}$ and their joint intensity distribution $p_o(i_r, i_f)$, mapping a marginal intensity distribution of the observed pair $O=\{o_r, o_f\}$ to a marginal intensity distribution of the training pair $L=\{l_r, l_f\}$, and estimating a set of parameters T that registers image $o_f$ to image $o_r$ by maximizing a weighted sum of a Jensen-Shannon divergence (JSD) of a joint intensity distribution of the observed pair and a joint intensity distribution of the training pair and a similarity measure between the observed images.

20 Claims, 11 Drawing Sheets

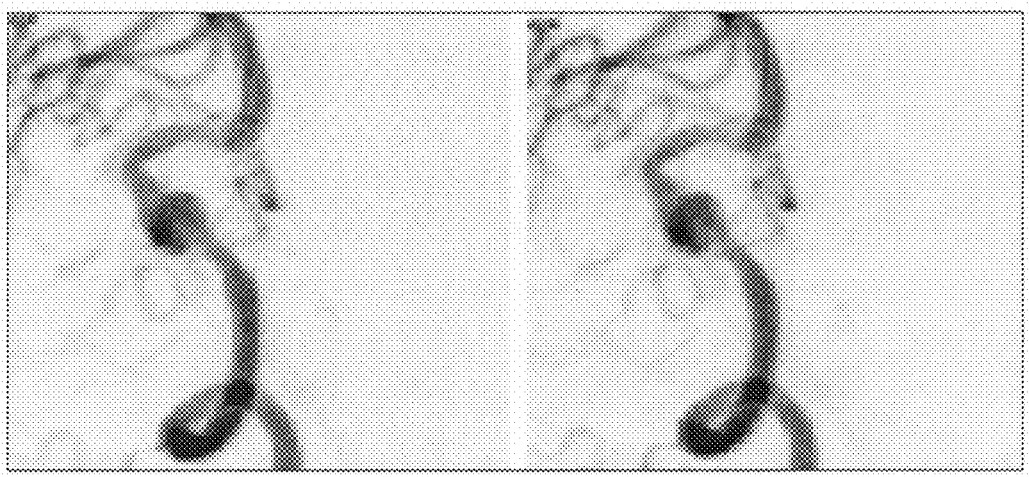
FIG. 2(a) Training Pair
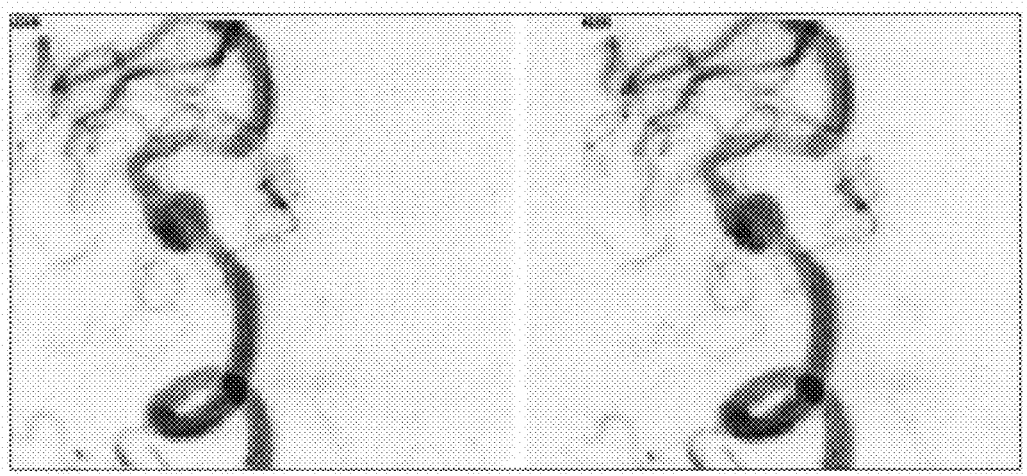
FIG. 2(b) Testing Pair

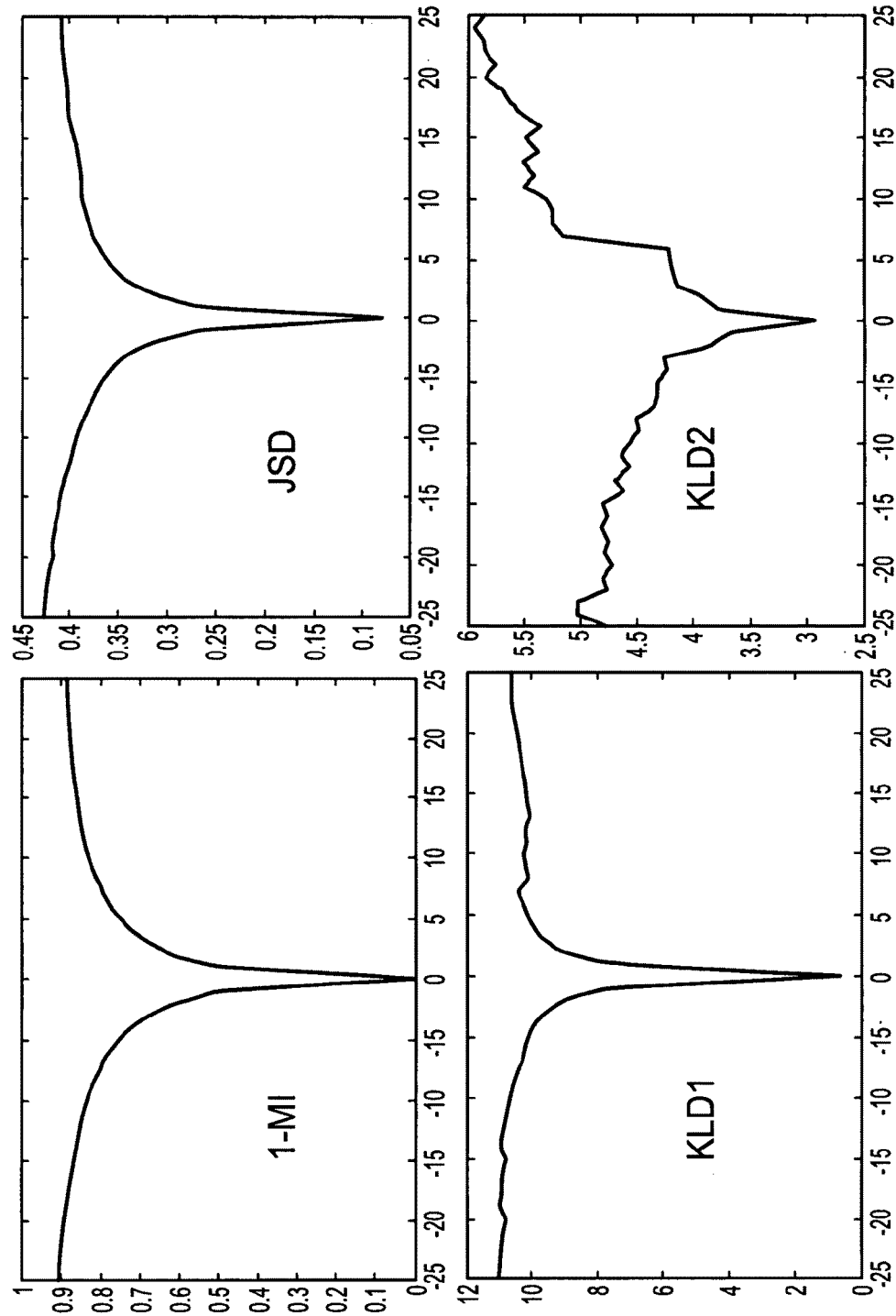
FIG. 2(c) Four Measures

Testing Pair with window-level

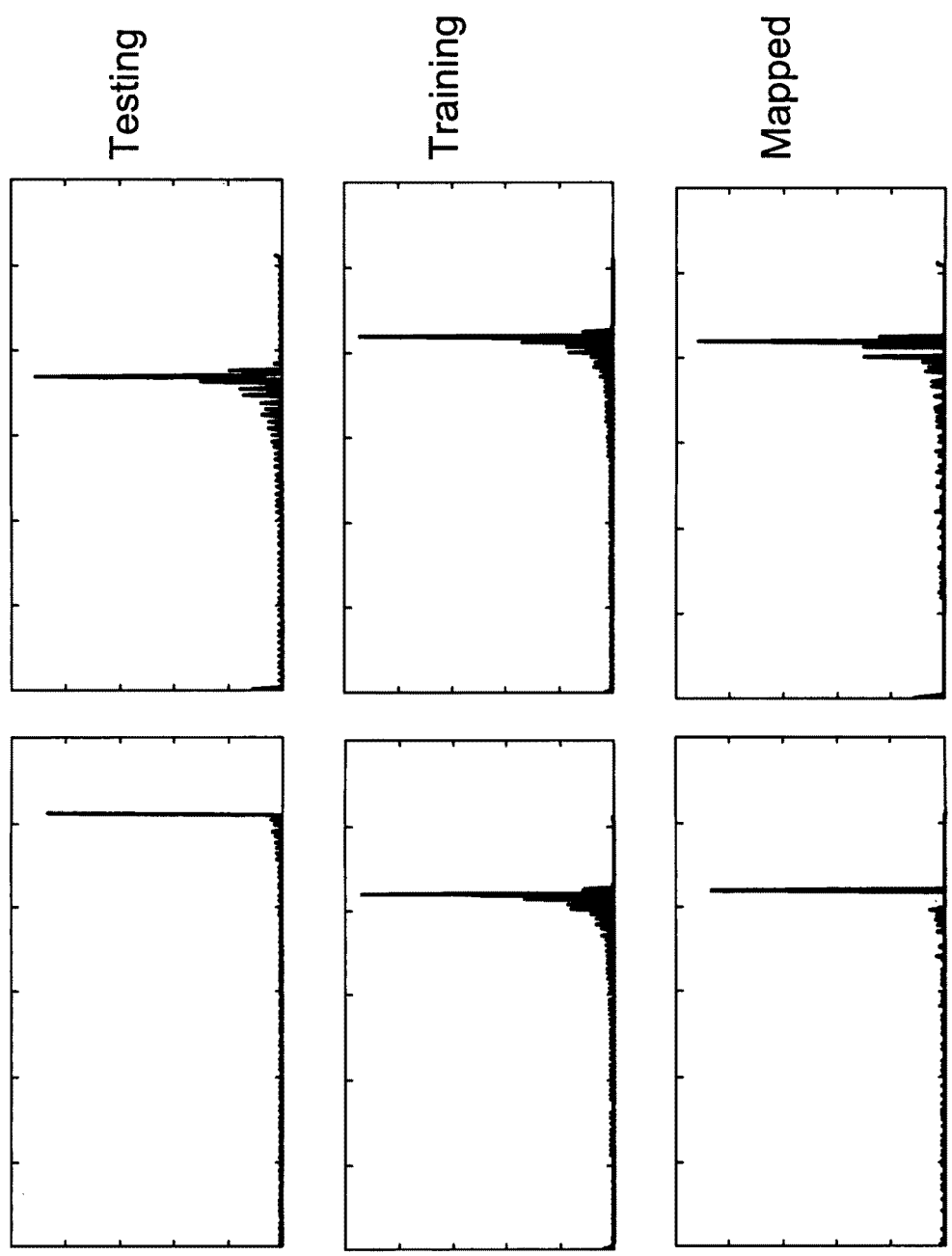
FIG. 3(b) Marginal Histogram

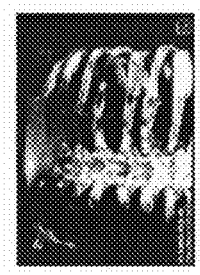
FIG. 4(c) 3D DynaCT
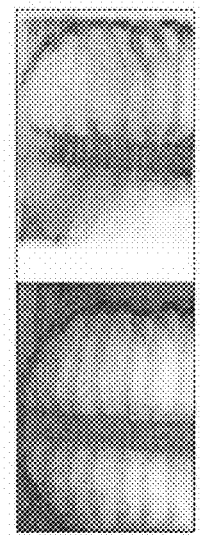
FIG. 4(b) Testing Pair
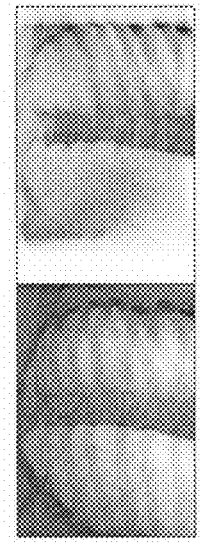
FIG. 4(a) Training Pair
FIG. 4(g) MI + Prior
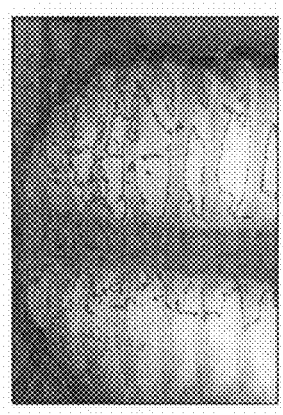
FIG. 4(f) Prior
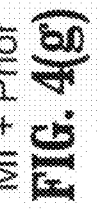
FIG. 4(e) MI
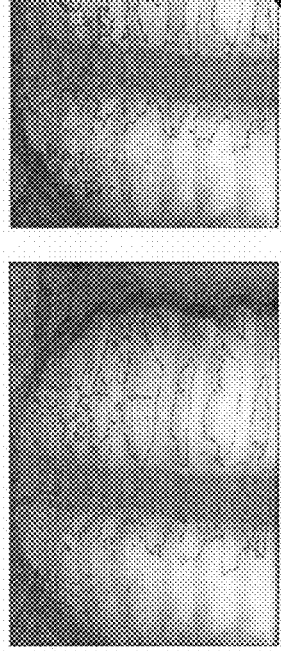
FIG. 4(d) Initial Position

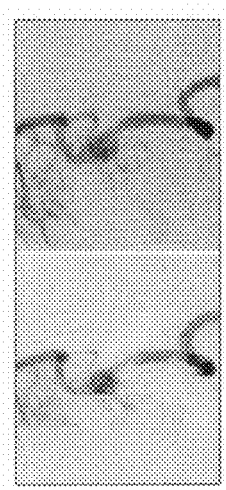
FIG. 5(a) Training Pair
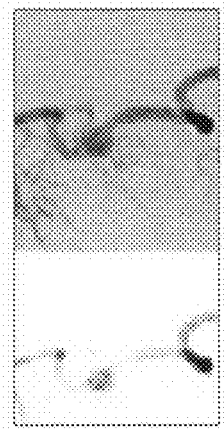
FIG. 5(b) Testing Pair
FIG. 5(c) 3D Angio
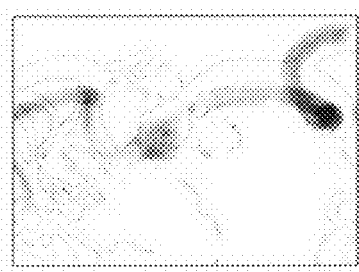
FIG. 5(d) Initial Position
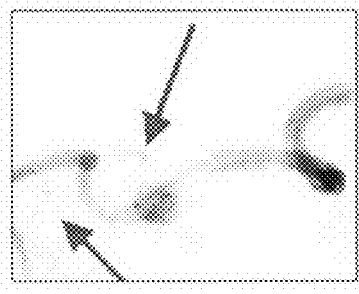
FIG. 5(e) PI
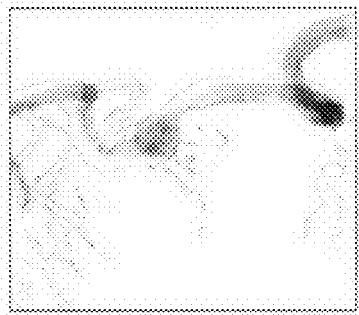
FIG. 5(f) Prior
FIG. 5(g) PI + Prior Program : $P_o\_Mapped = Mapping(P_0, C_{or}, C_{lr})$ $P_o\_Mapped$ : the joint histogram of $\{o_r, o_f\}$ after mapping $P_o$ : the joint histogram of $\{o_r, o_f\}$ $C_{or}$ : the marginal cumulative histogram of $o_r$ $C_{lr}$ : the marginal cumulative histogram of $l_r$ Initialization:
Set all the entries in $P_o\_Mapped$ to zero
$index\_o_r = 0$; $last\_mapped\_l_r = 0$; $mapped\_index = 0$;

Mapping Loop:
for $index\_l_r = 0$ to the number of entries in $l_r$
    while $C_{or}(index\_o_r) <= C_{lr}(index\_l_r)$
        if $last\_mapped\_l_r == index\_l_r$
            $mapped\_index = index\_l_r$
        else
            $mapped\_index = k$ where
                $last\_mapped\_l_r <= k <= index\_l_r$ and
                $P_{lr}(k)$ is closest to $P_{or}(index\_o_r)$ for $j = 0$ to the number of entries in $o_f$
            $P_o\_Mapped(mapped\_index, j) += P_o(index\_o_r, j)$ $index\_o_r ++$
        $last\_mapped\_l_r = index\_l_r$
        if $index\_o_r >$ the number of entries in $o_r$
            exit the algorithm end // while loop
end // for loop

FIG. 6

SYSTEM AND METHOD FOR LEARNING-BASED 2D/3D RIGID REGISTRATION FOR IMAGE-GUIDED SURGERY USING JENSEN-SHANNON DIVERGENCE

CROSS REFERENCE TO RELATED UNITED STATES APPLICATIONS

This application claims priority from: "Learning-Based 2D/3D Rigid Registration for Image-Guided Surgery", U.S. Provisional Application No. 60/794,805 of Liao, et al., filed Apr. 24, 2006, the contents of which are herein incorporated by reference.

TECHNICAL FIELD

This disclosure is directed to the registration of 3-dimensional (3D) volumetric data to 2-dimensional (2D) X-ray images.

DISCUSSION OF THE RELATED ART

Registration of 3D volumetric data to 2D X-ray images has many applications in image-guided surgery, varying from verification of patient position to working projection searching. 2D/3D registration brings high-quality 3-dimensional medical data such as computed tomography (CT), magnetic resonance imaging (MRI) or positron emission tomography (PET), into the same coordinate system of the 2-dimensional X-ray images that are commonly used in the operation room t monitor surgical procedures and provide guidance during surgery. Merging of the preoperative 3D data can enhance the visualization from the 2D projected images that lack the depth information and some important anatomical features, and introduce potentially useful complementary information in finding the best path for the medical instruments to a targeted area.

Techniques for 2D/3D registration can be divided into two general groups: feature based methods and intensity-based methods. Feature-based methods register salient features that have been segmented automatically or semi-manually. While this approach exhibits fast execution time and high robustness in the face of large mis-registration, the final accuracy relies on the accuracy of the preprocessing step, i.e. segmentation. In comparison, intensity-based methods use the entire image information for registration, and have been shown to provide substantially more accurate and reliable results than their feature-based counterparts.

In recent years, learning-based methods have been suggested for general medical registration to impose prior knowledge to achieve more robust and reliable registration. An exemplary method includes maximizing the log likelihood of the joint intensity distribution of the observed images was with respect to the expected joint intensity distribution. In another example, the Kullback-Leibler divergence (KLD) has been shown to be superior to the log likelihood measurement, and to the Mutual Information (MI) measure for 2D/3D registration. A learning-based method has been applied to 2D non-rigid image registration where the KLD with respect to a prior joint distribution was minimized together with the maximization of the MI measure.

SUMMARY OF THE INVENTION

Exemplary embodiments of the invention as described herein generally include methods and systems for a learning-based method that incorporates the prior information on the expected joint intensity histogram for robust real-time 2D/3D registration. A Jensen-Shannon divergence (JSD) is used to quantify the statistical (dis)similarity between the observed and expected joint histograms. Unlike KLD, JSD is symmetric, bounded, and a true metric, which has triggered its popularity in various applications ranging from statistical language analysis, image edge detection and segmentation, to DNA sequence analysis. The JSD provides a more suitable measure than KLD in quantifying histogram discrepancy because some histogram bins may vanish for the training data but not for the observed data or vise versa, in which case KLD is undefined. Furthermore JSD is upper-bounded and symmetric, facilitating its easy use as one of the factors in the driving force for registration. A nonlinear histogram mapping technique is proposed to handle the intensity difference between the observed data and the training data so that the learned prior can be used for registration of a wide range of data subject to intensity variations.

Depending on how well the a priori represents the observed data, the registration process is driven by a compounding effect of the statistical consistency of the observed joint histogram to the learned prior and the statistical dependence between the individual intensity distributions of the images being registered. Furthermore, there is no requirement that image segmentation and labeling be performed beforehand, whose error can lead to further errors in subsequent registration. Instead, the automatic nonlinear histogram mapping is performed iteratively during the matching process to handle the intensity discrepancy between the observed data and the training data. An intensity-based histogram is used, which results in a higher registration accuracy in the generation of digitally reconstructed radiographs (DRRs). DRRs are the simulated projection images from the 3D volume that are iteratively produced and compared with the 2D X-ray images during 2D/3D registration. Since DRRs need to be generated a large number of times, the computational efficiency in their calculation directly affects the efficiency of the whole registration algorithm, which makes the utilization of intensity-based histogram totally feasible.

A method according to an embodiment of the invention was applied to synthetic, phantom and clinical data. Experimental results demonstrate that a combination of the prior knowledge and the low-level similarity measure between the images being registered led to a more robust and accurate registration in comparison with the cases where either of the two factors was used alone as the driving force for registration.

According to an aspect of the invention, there is provided a method of registering 3-dimensional digitized images to 2-dimensional digitized images during a medical procedure including providing a pair of correctly-registered training images $L=\{l_r, l_f\}$ and their joint intensity distribution $p_l(i_r, i_f)$, wherein $i_r$ and $i_f$ are reference and floating images, respectively, providing a pair of observed images $O=\{o_r, o_f\}$ and their joint intensity distribution $p_o(i_r, i_f)$, mapping a marginal intensity distribution of the observed pair $O=\{o_r, o_f\}$ to a marginal intensity distribution of the training pair $L=\{l_r, l_f\}$, and estimating a set of parameters T that registers image $o_f$ to image $o_r$ by maximizing a weighted sum of a Jensen-Shannon divergence (JSD) of a joint intensity distribution of the observed pair and a joint intensity distribution of the training pair and a similarity measure between the observed images.

According to a further aspect of the invention, mapping the marginal intensity distribution of the observed pair to the marginal intensity distribution of the training pair comprises mapping an intensity i for observed image $o_r$ to intensity k for training image $l_r$ where k minimizes an absolute difference between the marginal histograms $p_{o_r}(i)$ and $p_{l_r}(k)$ of $o_r$ and $l_r$, respectively, where $t_1 \leq k \leq t_2$ with $t_1$ and $t_2$ defined by $C_{l_r}(t_1-1) < C_{o_r}(i-1) \leq C_{l_r}(t_1)$ and $C_{l_r}(t_2-1) < C_{o_r}(i) \leq C_{l_r}(t_2)$ wherein $C_{o_r}()$ and $C_{i_r}()$ denote cumulative density functions of $o_r$ and $l_r$, respectively.

According to a further aspect of the invention, one of said pair of observed images is a 2D digitally reconstructed radiograph (DRR) generated from a 3-dimensional (3D) image of a medical target, and the other of said pair is a live 2-dimensional (2D) X-ray image of said medical target.

According to a further aspect of the invention, the registration parameters T comprise six parameters that characterize a pose of said 3D image with respect to said 2D X-ray image.

According to a further aspect of the invention, maximizing said weighted sum comprises maximizing an expression equivalent to $$\alpha(1-JSD(p_l \| p_o^T)) + (1-\alpha)[MI(o_r, o_f^T) \text{ or } PI(o_r, o_f^T)],$$

wherein $JSD(p_l \| p_o^T)$ is a Jensen-Shannon divergence of the joint intensity distribution $p_l$ of the training images and of the joint intensity distribution $p_o^T$ of the observed images wherein one of said observed images has been registered to the other via the parameters T, $MI(o_r, o_f^T)$ is a Mutual Information measure of the registered observed images, $PI(o_r, o_f^T)$ is a Pattern Intensity measure of the registered observed images, and $\alpha$ is a weighting factor with values between 0 and 1.

According to a further aspect of the invention, the expression is maximized using a Hill-climbing optimization method.

According to a further aspect of the invention, the Jensen-Shannon divergence is defined as $$JSD(p_l \| p_o^T) = \frac{1}{2} D(p_l \| p_M) + \frac{1}{2} D(p_o^T \| p_M), \; p_M = \frac{1}{2}(p_l + p_o^T),$$

where $$D(p_1 \| p_2) = \int \int_{r^i i_f} p_1(i_r, i_f) \log[p_1(i_r, i_f) / p_2(i_r, i_f)] d i_r d i_f,$$

wherein $i_r$ and $i_f$ are the intensities of a reference image and a floating image, respectively, in each pair of training and observed images.

According to a further aspect of the invention, the Mutual Information measure of the registered observed images is defined as $$MI(o_r, o_f^T) = \int \int_{r^i i_f} p_o^T(i_r, i_f) \log[p_o^T(i_r, i_f) / (p_{o_r}(i_r) p_{o_f}^T(i_f))] d i_r d i_f,$$

wherein $p_{o_r}(i_r)$ and $p_{o_f}^T(i_f)$ are the marginal distributions for $o_r$ and $o_f^T$, respectively.

According to a further aspect of the invention, the Pattern Intensity measure of the registered observed images is defined as $$PI(o_r, o_f^T) = \int \int_{x,y} \sigma^2 / [\sigma^2 + (o_d(x, y) - o_d(v, w))^2] dx dy,$$

wherein $o_d = o_r - o_f^T$ is a difference image, $o_d(x,y)$ denotes the intensity value of $o_d$ at pixel $(x,y)$, wherein $(v-x)^2 + (w-y)^2 < R^2$ define the region centered at $(x,y)$ with radius R, wherein $\sigma$ and R are pre-defined constants.

According to a further aspect of the invention, the method comprises repeating the steps of providing a pair of observed images, mapping a marginal intensity distribution of the observed pair to a marginal intensity distribution of the training pair, and estimating a set of parameters T that registers the observed pair of images until a difference in parameter values T between iterations is sufficiently small.

According to another aspect of the invention, there is provided a program storage device readable by a computer, tangibly embodying a program of instructions executable by the computer to perform the method steps for registering 3-dimensional digitized images to 2-dimensional digitized images during a medical procedure.

BRIEF DESCRIPTION OF THE DRAWINGS

FIGS. 2(a)-(c) illustrates a comparison of four measures versus horizontal displacement: mutual information, JSD, and two KLDs with different orders of the training data and testing data, according to an embodiment of the invention.

FIG. 3(a)-(c) depicts use of a nonlinear histogram mapping to align the marginal histograms of the testing pair with that of the training pair, according to an embodiment of the invention.

FIGS. 4(a)-(g) illustrate registration results of chest phantom using different types of driving force, according to an embodiment of the invention.

FIG. 5(a)-(g) illustrate registration results of in vivo neurovascular using different types of driving force, according to an embodiment of the invention.

FIG. 6 is pseudocode for a nonlinear marginal histogram mapping algorithm, according to an embodiment of the invention.

DETAILED DESCRIPTION OF THE EXEMPLARY EMBODIMENTS

Figure 1:
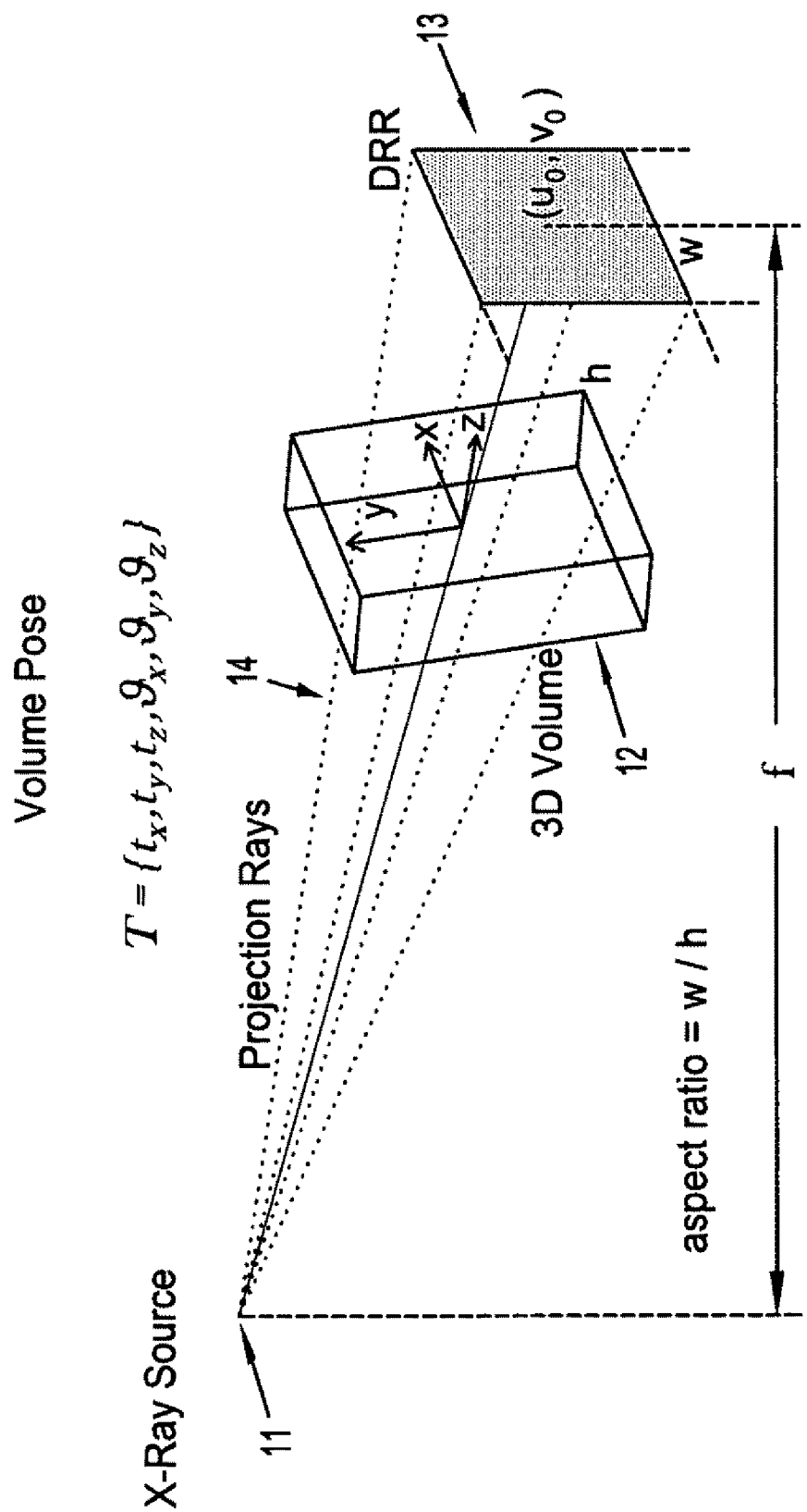
FIG. 1 illustrates the generation of digitally reconstructed radiographs (DRRs), according to an embodiment of the invention.

Exemplary embodiments of the invention as described herein generally include systems and methods for learning-based 2D/3D rigid registration. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Given a pair of correctly-registered training images $L=\{l_r, l_f\}$ (r and f stand for the reference and floating images, respectively) with a joint intensity distribution $p_l(i_r, i_f)$, stating which intensities $i_r$ and $i_f$ are likely to be in correspondence, in the framework of Bayesian inference, the registration of a novel pair of images $O=\{o_r, o_f\}$ can be formulated as retrieving the transformation T that maximizes the conditional probability of observing the image pair $O^T=\{o_r, o_f^T\}$ ($o_f^T$ is the floating image $o_f$ after transformation T), given the training pair L and the initially observed pair O:

$$p(T, O^T | O, L) \propto p(L | T, O^T, O) p(T | O^T, O) p(O^T | O) \qquad (1)$$

The three terms on the right-hand side of EQ. (1) represent three factors that drive the matching process. The first term indicates the consistency between the observed pair $O^T$ and the training pair L. The second term specifies the a priori-probability of the transformation T. In the case of rigid-body transformation where all combinations of translations and rotations are considered equally likely, this term can be dropped in a maximization. The third term measures the similarity between the two observed images $o_r$ and $o_f^T$. Hence a method according to an embodiment of the invention maximizes the compounding effect of the first and the third factors, whose modeling will be articulated in following sections.

Consistency with Learned Distribution

Assuming the observed pair $O^T=\{o_r, o_f^T\}$ for a given transformation T gives rise to a joint histogram $p_o^T(i_r, i_f)$, the first factor in EQ. (1) can be modeled by the (inverse) JSD between $p_o^T$ and $p_l$, stating that independent of the transformation T and the initial observation O, the statistically more coherent the observed histogram to the learned histogram in terms of JSD, the more likely the observed images are registered:

$$p(L | T, O^T, O) = p(L | O^T) \propto -JSD(p_l \| p_o^T), \qquad (2)$$

$$JSD(p_l \| p_o^T) = \frac{1}{2} D_{KL}(p_l \| p_M) + \frac{1}{2} D_{KL}(p_o^T \| p_M), \; p_M = \frac{1}{2}(p_l + p_o^T), \qquad (3)$$

where $$D_{KL}(p_1 \| p_2) = \int\!\!\int_{r,i_f} p_1(i_r, i_f) \log[p_1(i_r, i_f) / p_2(i_r, i_f)] di_r di_f \qquad (4)$$

is the well-known KLD measure. It can be shown that unlike KLD, $JSD(p_l \| p_o^T)$ in EQ. (3) is upper-bounded by log(2), and therefore can be easily normalized to be on the same order of magnitude as the third term in EQ. (1). Furthermore, JSD is the square of a true metric, therefore it is symmetric and removes the nuisance in the use of KLD arising from its asymmetry. Moreover, JSD is well-defined even when there exists $i_r, i_f$ such that $p_o^T(i_r, i_f) > 0$ but $p_l(i_r, i_f) = 0$, in which case KLD is undefined.

Dependence Between the Two Images Being Registered

To model the third factor in EQ. (1), two similarity measures can be implemented: Mutual Information (MI) and the Pattern Intensity (PI). Therefore, independent of the initial observation O, the more similar $o_f^T$ is with respect to $o_r$ in terms of the MI or PI measure, the better they are registered with each other:

$$p(O^T | O) = p(O^T) \propto MI(o_r, o_f^T) \qquad (5)$$
$$\text{or}$$
$$\propto PI(o_r, o_f^T),$$

$$MI(o_r, o_f^T) = \int\!\!\int_{r,i_f} p_o^T(i_r, i_f) \log[p_o^T(i_r, i_f) / (p_{o_r}(i_r) p_{o_f}^T(i_f))] di_r di_f, \qquad (6)$$

where $p_{o_r}(i_r)$ and $p_{o_f}^T(i_f)$ are the marginal distributions for $o_r$ and $o_f^T$, respectively, and $$PI(o_r, o_f^T) = \int\!\!\int_{x,y} \sigma^2 / [\sigma^2 + (o_d(x, y) - o_d(v, w))^2] dx dy, \qquad (7)$$

where $o_d = o_r - o_f^T$ is the difference image, $O_d(x,y)$ denotes the intensity value of $o_d$ at pixel (x,y), with $(v-x)^2+(w-y)^2 < R^2$ defining the region centered at (x,y) with radius R. When two images are registered, there will be a minimum number of structures in the difference image $o_d$. Pattern intensity considers a pixel to belong to a structure if it has a significantly different intensity value from its neighboring pixels. According to an embodiment of the invention, good working parameters were found to be $\sigma=10$ and $R=3$.

Nonlinear Marginal Histogram Mapping

The marginal intensity distribution of the observed data can differ from that of the training data for many reasons. For example, specific in 2D/3D registration, the window-level for X-ray images are often adjusted during the operation to provide optimal visualization. In digitally subtracted angiography (DSA), the injected contrast agent flows during the sequence, resulting in the difference in the intensity contrast in the subtracted images. Several parameters are also adjustable for DRR generation, leading to the difference in the intensity values of the generated DRR.

In order to maximize the effective range of the learned prior for registration purpose, according to an embodiment of the invention, a monotonic nonlinear mapping technique can be used to align the marginal intensity distribution of the observed image to that of the training image.

For simplicity, how the reference images $o_r$ and $l_r$ are mapped to each other will be explained. The purpose is to ensure that the properties learned from the training pair can be used to drive the registration of the observed image pair, even if the window level, contrast, etc., in the observed image pair is different from that of the training image pair. The floating images are mapped in the same manner. In the ideal case, intensity i for $o_r$ should be mapped to intensity i' for $l_r$ where $C_{o_r}(i) = C_{l_r}(i')$. Here $C_{o_r}(\,)$ and $C_{l_r}(\,)$ denote the cumulative density function (CDF) of $o_r$ and $l_r$ respectively. For a discrete histogram distribution, perfect mapping typically cannot be achieved. According to an embodiment of the invention, i can be mapped to i'=k where k minimizes the difference between the marginal histograms $p_{o_r}(\,)$ and $p_{l_r}(\,)$ of $o_r$ and $l_r$, respectively, $|p_{o_r}(i) - p_{l_r}(k)|$, $t_1 \leq k \leq t_2$, with $t_1$ and $t_2$ defined by:

$$C_{l_r}(t_1 - 1) < C_{o_r}(i-1) \leq C_{l_r}(t_1) \quad \text{and} \quad C_{l_r}(t_2 - 1) < C_{o_r}(i) \leq C_{l_r}(t_2). \qquad (8)$$

Pseudo-code for this algorithm according to an embodiment of the invention is presented in FIG. 6. Referring to the figure, the local histogram difference minimization step is tested while $C_{o_r}(i) \leq C_{l_r}(i')$ and serves to optimally align the histogram of the observed image to that of the training image, This mapping according to an embodiment of the invention is similar to an image processing technique called histogram equalization (HE) with two major differences. First, unlike HE, whose targeted distribution is a uniform distribution, a targeted distribution according to an embodiment of the invention is the marginal distribution of the training image, which can be arbitrary. Second, in HE, the mapping is essentially $i \rightarrow i' = k$ where $C(k-1) < C_{o_r}(i) \leq C(k)$ and $C()$ denotes the CDF of the uniform distribution, while a mapping according to an embodiment of the invention includes the local histogram difference minimization step, which is useful for the robust measurement of the similarity between the expected and mapped joint distributions in registration.

Obtaining the Transformation Parameters

The transformation relating points in the 3D volume to points on the projected X-ray image has six extrinsic rigid-body parameters $T=\{t_x,t_y,t_z,\upsilon_x,\upsilon_y,\upsilon_z\}$ that are estimated by the iterative registration algorithm, and four intrinsic perspective projection parameters that are fixed. FIG. 1 depicts an exemplary X-ray imaging system based on a pinhole cameral model used for generating DRRs, with an X-ray source 11, a 3D volume 12 with body axes x, y, z, and projection plane 13. Projection rays 14 are radiated from the X-ray source 11 through the 3D volume 12 to form a DRR at the projection plane 13. The four intrinsic perspective projection parameters, indicated in FIG. 1, are: (1) the focal length in pixels, f; (2) the x-coordinate of the center of projection in pixels, $u_0$; (3) the y-coordinate of the center of projection in pixels, $v_0$; and (4) the aspect ratio, the ratio of the width w of the image to the height h of the image. The extrinsic parameters T represent those translations and rotations of the 3D volume 12 with respect to each of the 3 body axes need to align it with the DRR plane 13.

Digitally reconstructed radiographs (DRRs), the simulated projection images obtained from the 3D volume for registration with the 2D X-ray image, can be generated using the 2D texture-based volume rendering technique on the graphics processing unit (GPU), which yields better computational efficiency than software-based DRR generation technique such as ray-casting. It takes about 20 ms to generate 256×256 DRRs from a 256×256×253 volume with an NVidia Quadro FX Go1400, resulting in a typical registration time in the range of 10~30 s.

Figure 7:
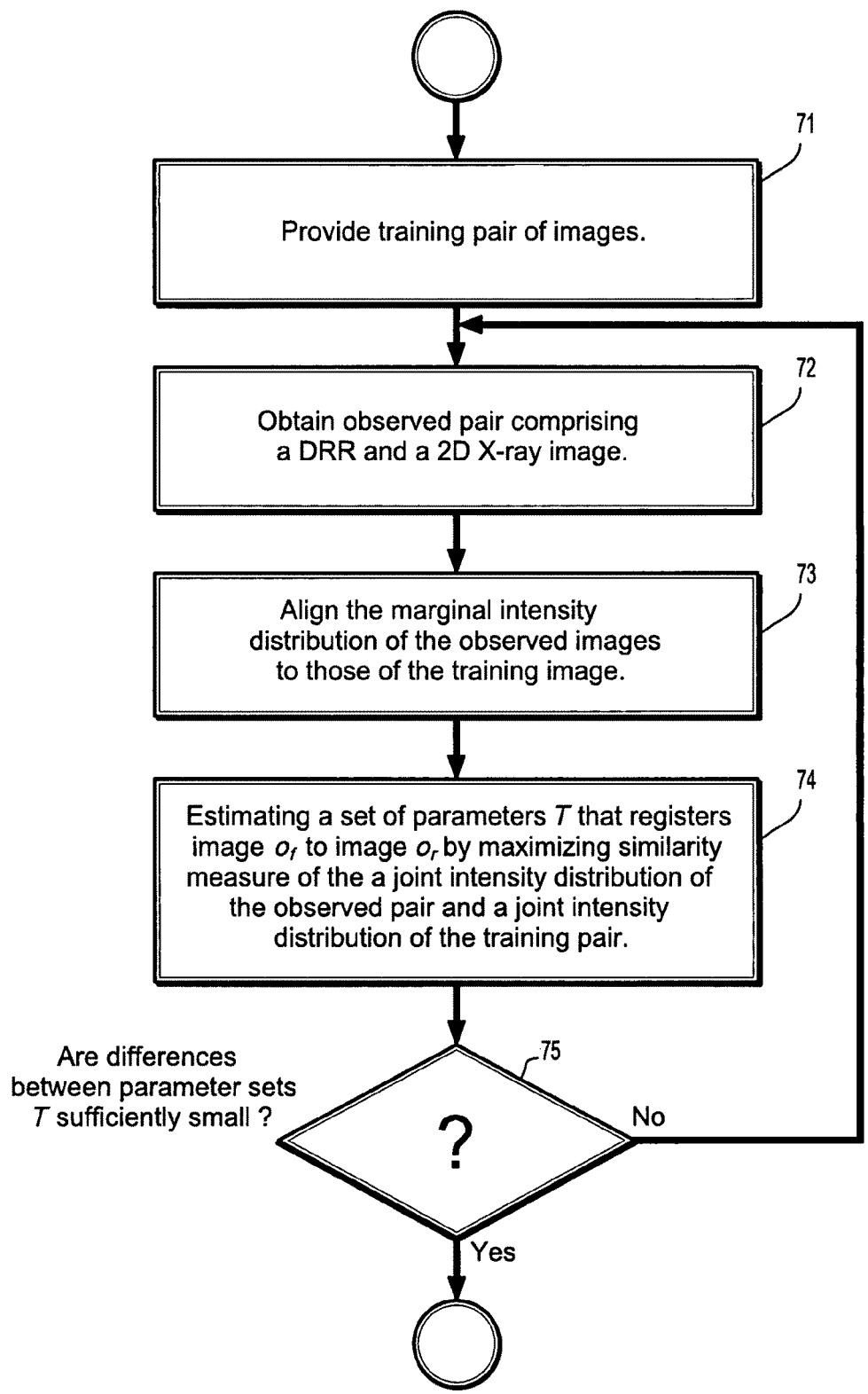
FIG. 7 is a flow chart of a learning-based 2D/3D rigid registration method according to an embodiment of the invention.

FIG. 7 is a flow chart of a learning-based 2D/3D rigid registration method for deriving transformation parameters T, according to an embodiment of the invention. It is assumed that this registration is being performed during a medical procedure, such as surgery, and there is an X-ray imaging apparatus attached to a C-arm that provides essentially live images in real-time. Referring to the figure, a method begins at step 71 by providing a pair of correctly-registered training images $L=\{l_r, l_f\}$ and their joint intensity distribution $p_l(i_r, i_f)$, along with a pre-operative 3D image volume of the target area in a patient acquired from a medical imaging modality. A DRR is generated from the 3D image volume at step 72, and a 2D X-ray is obtained from the X-ray imaging apparatus. At each iteration, the X-ray image and the generated DRRs are taken as the observed pair $O=\{o_r, o_f\}$. At step 73, the marginal intensity distribution of the observed pair $O=\{o_r, o_f\}$ is mapped to that of the training pair $L=\{l_r, l_f\}$ through the nonlinear distribution mapping described above:

$$i \rightarrow i' = k: \min_{t_1 < k < t_2} |p_{o_r}(i) - p_{l_r}(k)| \text{ with } t_1 \text{ and } t_2 \text{ defined by:}$$

$$C_{l_r}(t_1 - 1) < C_{o_r}(i - 1) \leq C_{l_r}(t_1)$$

and $$C_{l_r}(t_2 - 1) < C_{o_r}(i) \leq C_{l_r}(t_2)$$

At step 74, in order to estimate the correct pose T of the 3D volume, the following variational formulation is maximized:

$$SM_{total} = \alpha(1-JSD(p_l\|p_o^T))+(1-\alpha)[MI(o_r,o_f^T) \text{ or } PI(o_r,o_f^T)], \quad (9)$$

where JSD( ), MI( ), and PI( ) are as described above, and $SM_{total}$ is the final total similarity measure that is maximized to estimate the 6 extrinsic parameters. An exemplary implementation uses a Hill-climbing optimization method. At step 75, the parameter values are compared with those from the previous iteration. If the difference in parameter values is sufficiently small, the iterations are terminated, otherwise the process loops back and repeats steps 72, 73, and 74.

Experiments

The first experiment compares the performance of JSD and KLD on simulated data. In this simplified experiment the reference and floating images in the training pair were exactly the same. The reference image in the testing pair was slightly different from the training reference image in angulations, and the floating image was a horizontally-translated version of the reference image. FIGS. 2(a)-(c) illustrates a comparison of four measures versus horizontal displacement for this experiment: mutual information, JSD, and two KLDs with different orders of the training data and testing data. FIG. 2(a) depicts the training pair, FIG. 2(b) depicts the testing pair, and FIG. 2(c) plots the several measures versus the displacement. It can be seen that the JSD produced a smoother curve than both of the KLD measures, which differed significantly in value due to the switch of the order of the training and testing pairs. The (one minus) MI measure is also plotted as a reference.

Figure 3A:
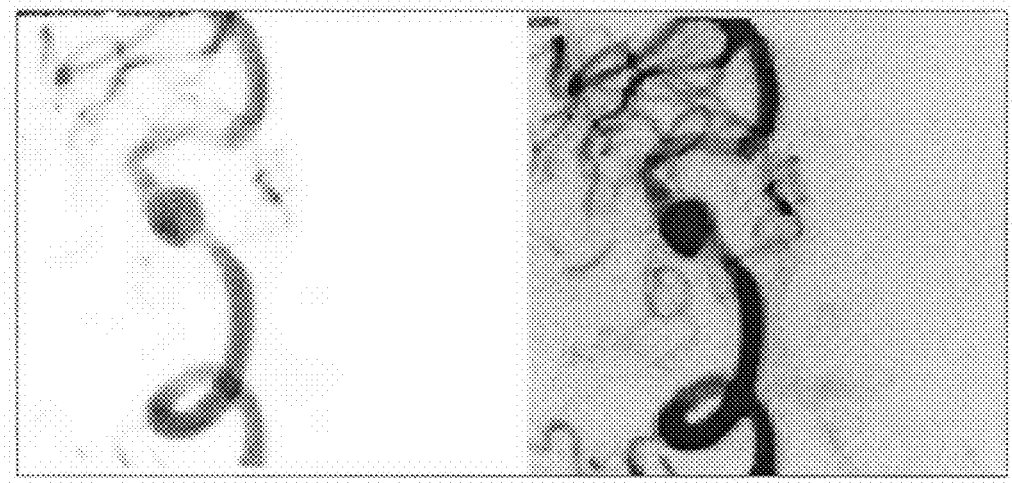
Figure 3C:
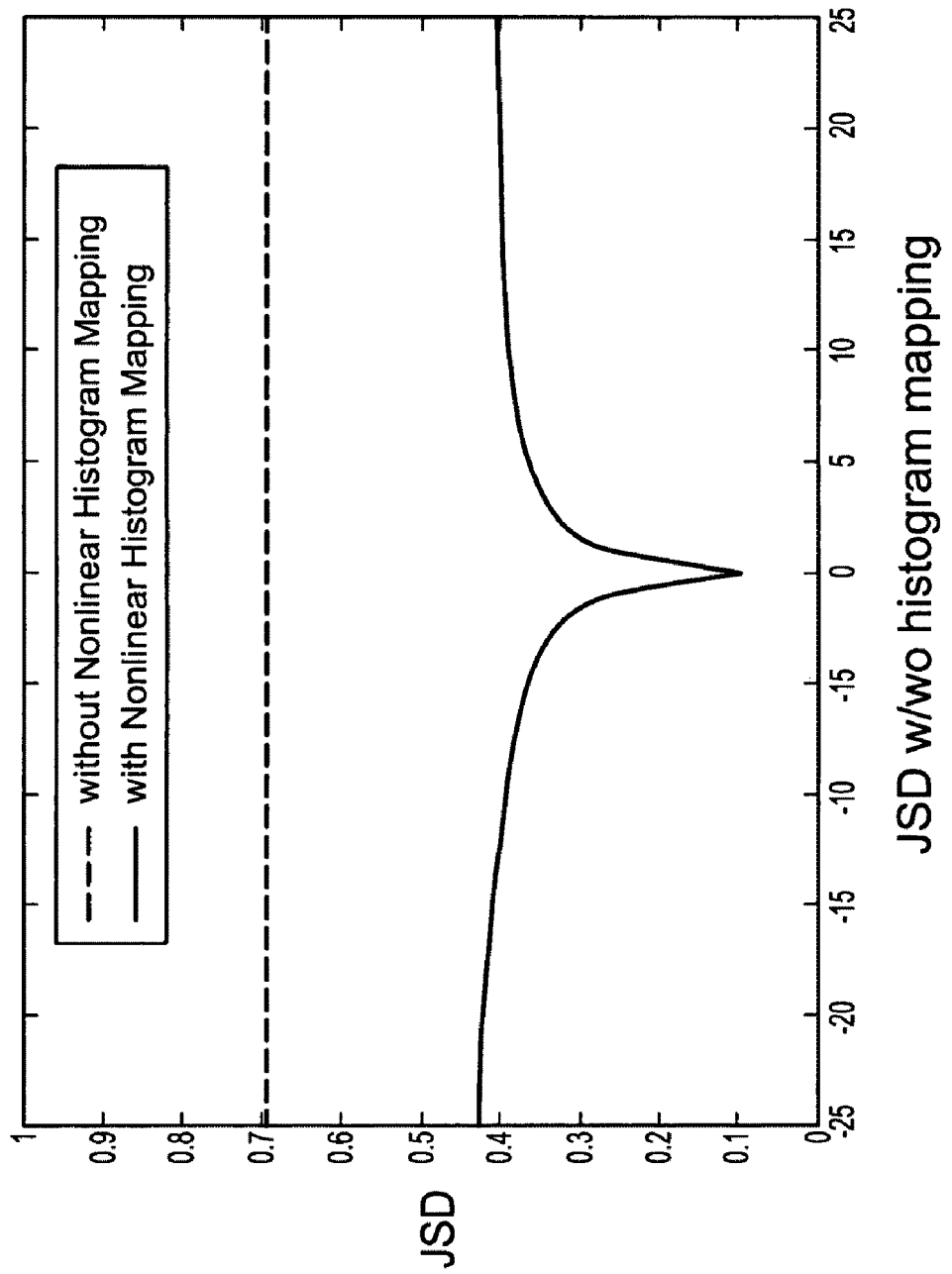

The second experiment investigates the effectiveness of the monotonic nonlinear histogram mapping technique according to an embodiment of the invention. The training pair was the same as that used in the first experiment, while the testing pair was window-leveled to an apparently different intensity range. FIG. 3(a)-(c) depicts use of a nonlinear histogram mapping to align the marginal histograms of the testing pair with that of the training pair. The testing pair is shown in FIG. 3(a). FIG. 3(b) plots the marginal histograms of the testing pair, training pair and mapped pair, while FIG. 3(c) shows the JSD without histogram mapping. As shown in FIG. 3(c), without mapping, the learned joint histogram could no longer effectively drive registration and the JSD curve becomes almost uniform across displacements. In contrast, a similar curve as that in the first experiment was achieved after the monotonic nonlinear mapping.

A method according to another embodiment of the invention was applied to registration of 3D DynaCT to 2D fluoroscopy. The object was a chest phantom and the 3D data (256×256×223, 0.8×0.8×0.8 mm) was perfectly aligned with the 2D fluoroscopies from two angles. FIGS. 4(a)-(g) illustrate registration results of chest phantom using different types of driving forces. The 2D image from the first angle and the corresponding DRR were used as the training pair, shown in FIG. 4(a), and the artificially-moved 3D DynaCT was then registered to the 2D fluoroscopy from the second angle, shown in FIG. 4(b). The 3D DynaCT image is shown in FIG.

4(c). FIG. 4(d) depicts the initial position from where the registration starts, i.e., the input to the registration procedure. Being able to use the images acquired from a different angle as the prior is useful in tracking patient motion when 3D DynaCT (3D Angio) is available, which is typically acquired in the same operation room as the 2D X-ray and should be perfectly aligned with the 2D images initially. Therefore the prior is readily available which can be used for re-registration if the patient moves during the operation. The outline of the rendered VRT image of the registered 3D volume is overlaid onto the 2D X-ray. Regions pointed by arrows show prominent differences in the accuracy of alignment. Different types of driving forces were tested: prior only (JSD); MI or PI only; and MI+JSD or PI+JSD, with $\alpha=0.5$ in EQ. (9). Using PI alone or PI+prior achieved relatively accurate and comparable registration for this data. However, using MI alone resulted in a largely wrong result, shown in FIG. 4(e). Prior only also did not lead to acceptable registration, as shown in FIG. 4(f). In contrast, when combining the prior information with the dependence between the images being registered, much more accurate registration was achieved, shown in FIG. 4(g), suggesting that these two factors provided complimentary information to each other that boosted the robustness of the algorithm. The whole registration process took about 20 s for MI measure and 40 s for PI measure on a Pentium®M 2.13 GHz computer. Using a prior did not noticeably increase the computational time, partially due to the faster convergence and hence fewer number of iterations.

A similar experiment according to another embodiment of the invention was applied to in vivo neuro-vascular data acquired during an aneurism operation. FIG. 5(a)-(g) illustrate these registration results of in vivo neuro-vascular using different types of driving force. One frame of the digitally subtracted angiography (DSA) sequence highlighting the contrast agent-filled vessels and the DRR generated from the 3D angio (256×256×253, 0.3×0.3×0.3 mm) after manual alignment were used as the training pair, shown in FIG. 5(a), and the testing pair was a 3D angio without manual alignment registered to a second frame of the DSA sequence with substantially different contrast intensity, shown in FIG. 5(b). The 3D angio itself is shown in FIG. 5(c). Similarly with FIG. 4(d), FIG. 5(d) depicts the initial position from where the registration starts. It is interesting to notice that there was a wrong global maximum for PI measure, possibly due to the simplicity of the vessel structures present in the image, so that when using PI only the registration was so off that the outline of the volume did not appear on the 2D image in the result, as shown in FIG. 5(e). However, the added factor of the prior information eliminated this wrong global maximum and achieved highly accurate registration when used together with PI, shown in FIG. 5(g). Again the prior alone did not produce as accurate registration because of the apparent intensity difference between the two DSA frames used for training and testing, shown in FIG. 5(f). In this experiment the MI measure and MI+prior produced comparably accurate results that are not shown. In addition, the fact that the intensity range of the testing DSA frame was substantially different from that of the training frame demonstrated the effectiveness of a histogram mapping technique according to an embodiment of the invention.

According to an embodiment of the invention, a registration driven by the combined factors of the prior information and the dependence between the images being registered is more robust than when either one of the two factors is used alone. The learned prior can enhance the registration performance by ruling out a highly unlikely registration that is very different from the training images, and can achieve equally good registration in the cases that the conventional similarity measures alone were able to drive a successful registration. The property of the JSD being upper-bounded makes the combination of the two factors readily controllable. The non-linear histogram mapping technique can expand the effective range of the learned prior.

Implementation

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 8:
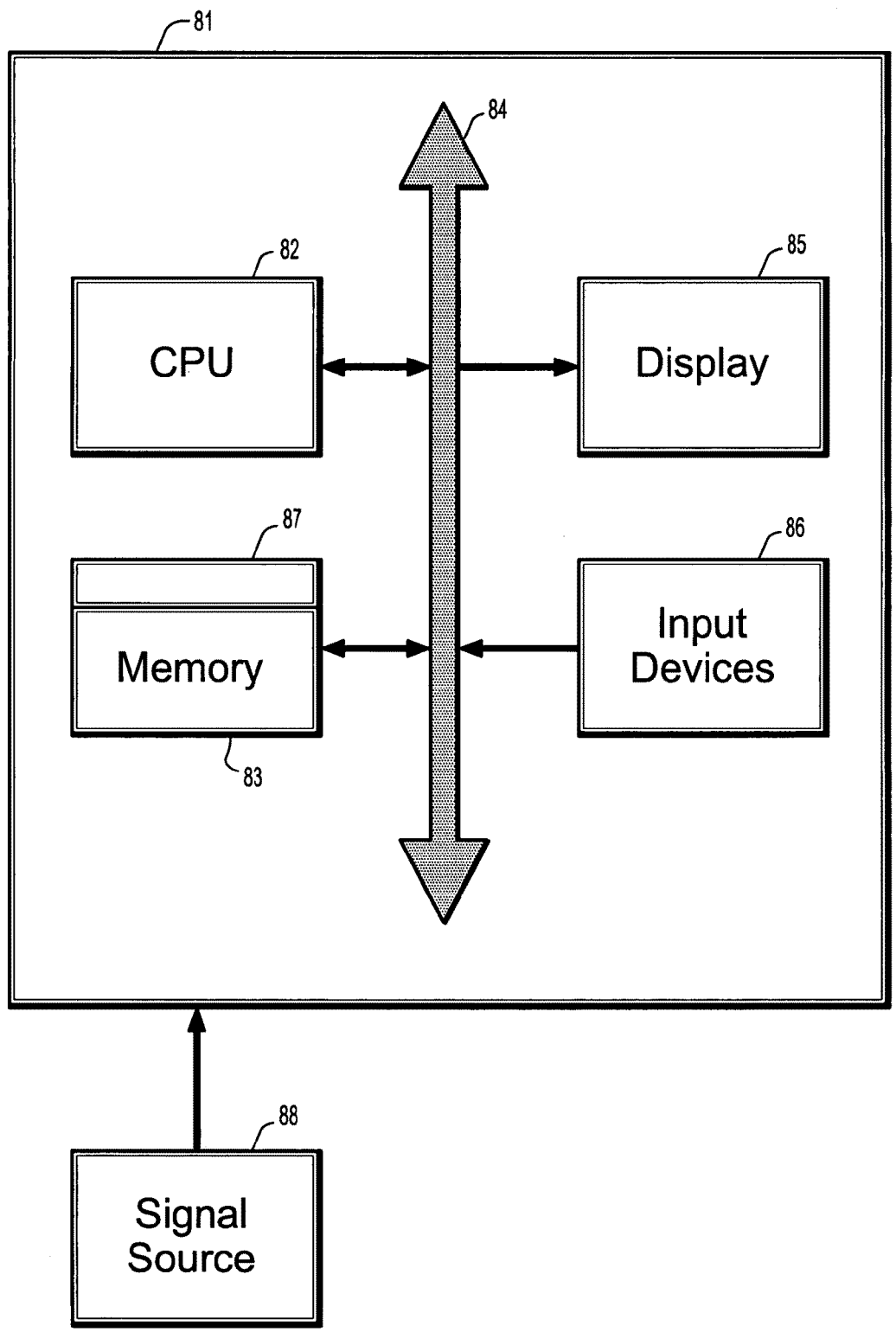
FIG. 8 is a block diagram of an exemplary computer system for implementing a learning-based 2D/3D rigid registration method, according to an embodiment of the invention.

FIG. 8 is a block diagram of an exemplary computer system for implementing a learning-based 2D/3D rigid registration method, according to an embodiment of the invention. Referring now to FIG. 8, a computer system 81 for implementing the present invention can comprise, inter alia, a central processing unit (CPU) 82, a memory 83 and an input/output (I/O) interface 84. The computer system 81 is generally coupled through the I/O interface 84 to a display 85 and various input devices 86 such as a mouse and a keyboard. The support circuits can include circuits such as cache, power supplies, clock circuits, and a communication bus. The memory 83 can include random access memory (RAM), read only memory (ROM), disk drive, tape drive, etc., or a combinations thereof. The present invention can be implemented as a routine 87 that is stored in memory 83 and executed by the CPU 82 to process the signal from the signal source 88. As such, the computer system 81 is a general purpose computer system that becomes a specific purpose computer system when executing the routine 87 of the present invention.

The computer system 81 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method of registering 3-dimensional digitized images to 2-dimensional digitized images during a medical procedure comprising the steps of:
    providing a pair of correctly-registered training images $L=\{l_r, l_f\}$, wherein $l_r$ and $l_f$ are reference and floating images, respectively, and their joint intensity distribution $p_t(i_r, i_f)$, wherein $i_r$ and $i_f$ are reference and floating images, respectively;

providing a pair of observed images O={$o_r$, $o_f$}, wherein $o_r$ and $o_f$ are reference and floating images, respectively, and their joint intensity distribution $p_o(i_r, i_f)$;

mapping a marginal intensity distribution of the observed pair O={$o_r$, $o_f$} to a marginal intensity distribution of the training pair L={$l_r$, $l_f$}; and estimating a set of parameters T that registers image $o_f$ to image $o_r$ by maximizing a weighted sum of a Jensen-Shannon divergence (JSD) of a joint intensity distribution of the observed pair and a joint intensity distribution of the training pair and a similarity measure between the observed images.

2. The method of claim 1, wherein mapping the marginal intensity distribution of the observed pair to the marginal intensity distribution of the training pair comprises mapping an intensity i for observed image $o_r$ to intensity k for training image $l_r$ where k minimizes an absolute difference between the marginal histograms $p_{o_r}(i)$ and $p_{l_r}(k)$ of $o_r$ and $l_r$ respectively, where $t_1 \leq k \leq t_2$ with $t_1$ and $t_2$ defined by $C_{l_r}(t_1-1) < C_{o_r}(i-1) \leq C_{l_r}(t_1)$ and $C_{l_r}(t_2-1) < C_{o_r}(i) \leq C_{l_r}(t_2)$ wherein $C_{o_r}()$ and $C_{l_r}()$ denote cumulative density functions of $o_r$ and $l_r$ respectively.

3. The method of claim 1, wherein one of said pair of observed images is a 2D digitally reconstructed radiograph (DRR) generated from a 3-dimensional (3D) image of a medical target, and the other of said pair is a live 2-dimensional (2D) X-ray image of said medical target acquired in real-time from said medical target during a medical procedure.

4. The method of claim 3, wherein said registration parameters T comprise six parameters that characterize a pose of said 3D image with respect to said 2D X-ray image.

5. The method of claim 4, wherein maximizing said weighted sum comprises maximizing an expression equivalent to $$\alpha(1-JSD(p_l \| p_o^T)) + (1-\alpha)[MI(o_r, o_f^T) \text{ or } PI(o_r, o_f^T)],$$

wherein $JISD(p_l \| p_o^T)$ is a Jensen-Shannon divergence of the joint intensity distribution $p_l$ of the training images and of the joint intensity distribution $p_o^T$ of the observed images wherein one of said observed images has been registered to the other via the parameters T, $MI(o_r, o_f^T)$ is a Mutual Information measure of the registered observed images, $PI(o_r, o_f^T)$ is a Pattern Intensity measure of the registered observed images, and $\alpha$ is a weighting factor with values between 0 and 1.

6. The method of claim 5, wherein said expression is maximized using a Hill-climbing optimization method.

7. The method of claim 5, wherein the Jensen-Shannon divergence is defined as $$JSD(p_l \| p_o^T) = \frac{1}{2} D(p_l \| p_M) + \frac{1}{2} D(p_o^T \| p_M), \quad p_M = \frac{1}{2}(p_l + p_o^T),$$

where $$D(p_1 \| p_2) = \int \int_{r_r, i_f} p_1(i_r, i_f) \log[p_1(i_r, i_f)/p_2(i_r, i_f)] di_r di_f,$$

wherein $i_r$ and $i_f$ are the intensities of a reference image and a floating image, respectively, in each pair of training and observed images, $p_l$ is either $p_l$ or $p_o^T$ and $p_2$ is $p_M$.

8. The method of claim 5, wherein the Mutual Information measure of the registered observed images is defined as $$MI(o_r, o_f^T) = \int \int_{r_r, i_f} p_o^T(i_r, i_f) \log[p_o^T(i_r, i_f)/(p_{o_r}(i_r) p_{o_f}^T(i_f))] di_r di_f,$$

wherein $p_{o_r}(i_r)$ and $p_{o_r}^T(i_f)$ are the marginal distributions for $o_r$ and $o_f^T$, respectively.

9. The method of claim 5, wherein the Pattern Intensity measure of the registered observed images is defined as $$PI(o_r, o_f^T) = \int \int_{x,y} \sigma^2 / [\sigma^2 + (o_d(x, y) - o_d(v, w))^2] dx dy,$$

wherein $o_d = o_r - o_f^T =$ is a difference image, $o_d(x,y)$ denotes the intensity value of $o_d$ at pixel (x,y), wherein $(v-x)^2 + (w-y)^2 < R^2$ define the region centered at (x,y) with radius R, wherein $\sigma$ and R are pre-defined constants.

10. The method of claim 1, further comprising repeating the steps of providing a pair of observed images, mapping a marginal intensity distribution of the observed pair to a marginal intensity distribution of the training pair, and estimating a set of parameters T that registers the observed pair of images until a difference in parameter values T between iterations is sufficiently small.

11. A program storage device readable by a computer, tangibly embodying a program of instructions executable by the computer to perform the method steps for registering 3-dimensional digitized images to 2-dimensional digitized images during a medical procedure comprising the steps of:

providing a pair of correctly-registered training images L={$l_r$, $l_f$}, wherein $l_r$ and $l_f$ are reference and floating images, respectively, and their joint intensity distribution $p_l(i_r, i_f)$, wherein $i_r$ and $i_f$ are reference and floating images, respectively;

providing a pair of observed images O={$o_r$, $o_f$}, wherein $o_r$ and $o_f$ are reference and floating images, respectively, and their joint intensity distribution $p_o(i_r, i_f)$;

mapping a marginal intensity distribution of the observed pair O={$o_r$, $o_f$} to a marginal intensity distribution of the training pair L={$l_r$, $l_f$} and estimating a set of parameters T that registers image $o_f$ to image $o_r$ by maximizing a weighted sum of a Jensen-Shannon divergence (JSD) of a joint intensity distribution of the observed pair and a joint intensity distribution of the training pair and a similarity measure between the observed images.

12. The computer readable program storage device of claim 11, wherein mapping the marginal intensity distribution of the observed pair to the marginal intensity distribution of the training pair comprises mapping an intensity i for observed image $o_r$ to intensity k for training image $l_r$ where k minimizes an absolute difference between the marginal histograms $p_{o_r}(i)$ and $p_{l_r}(k)$ of $o_r$ and $l_r$ respectively, where $t_1 < k < t_2$ with $t_1$ and $t_2$ defined by $C_{l_r}(t_1-1) < C_{o_r}(i-1) \leq C_{l_r}(t_1)$ and $C_{l_r}(t_2-1) < C_{o_r}(i) \leq C_{l_r}(t_2)$ wherein $C_{o_r}()$ and $C_{l_r}()$ denote cumulative density functions of $o_r$ and $l_r$ respectively.

13. The computer readable program storage device of claim 11, wherein one of said pair of observed images is a 2D digitally reconstructed radiograph (DRR) generated from a 3-dimensional (3D) image of a medical target, and the other of said pair is a live 2-dimensional (2D) X-ray image of said medical target acquired in real-time from said medical target during a medical procedure.

14. The computer readable program storage device of claim 13, wherein said registration parameters T comprise six parameters that characterize a pose of said 3D image with respect to said 2D X-ray image.

15. The computer readable program storage device of claim 14, wherein maximizing said weighted sum comprises maximizing an expression equivalent to $$\alpha(1-JSD(p_l\|p_o^T))+(1-\alpha)[MI(o_r, o_f^T) \text{ or } PI(o_r, o_f^T)],$$

wherein $JSD(p_l\|p_o^T)$ is a Jensen-Shannon divergence of the joint intensity distribution $p_l$ of the training images and of the joint intensity distribution $p_o^T$ of the observed images wherein one of said observed images has been registered to the other via the parameters T, $MI(o_r,o_f^T)$ is a Mutual Infoination measure of the registered observed images, $PI(o_r,o_f^T)$ is a Pattern Intensity measure of the registered observed images, and $\alpha$ is a weighting factor with values between 0 and 1.

16. The computer readable program storage device of claim 15, wherein said expression is maximized using a Hill-climbing optimization method.

17. The computer readable program storage device of claim 15, wherein the Jensen-Shannon divergence is defined as $$JSD(p_l\|p_o^T) = \frac{1}{2}D(p_l\|p_M) + \frac{1}{2}D(p_o^T\|p_M), \; p_M = \frac{1}{2}(p_l + p_o^T),$$

where $$D(p_1\|p_2) = \int\int_{r^i f} p_1(i_r, i_f)\log[p_1(i_r, i_f)/p_2(i_r, i_f)]di_r di_f,$$

wherein $i_r$ and $i_f$ are the intensities of a reference image and a floating image, respectively, in each pair of training and observed images, $p_l$ is either $p_l$ or $p_o^T$, and $p_2$ is $p_M$.

18. The computer readable program storage device of claim 15, wherein the Mutual Information measure of the registered observed images is defined as $$MI(o_r, o_f^T) = \int\int_{r^i f} p_o^T(i_r, i_f)\log[p_o^T(i_r, i_f)/(p_{o_r}(i_r)p_{o_f}^T(i_f))]di_r di_f,$$

wherein $p_{o_r}(i_r)$ and $p_{o_f}^T(i_f)$ are the marginal distributions for $o_r$ and $o_f^T$, respectively.

19. The computer readable program storage device of claim 15, wherein the Pattern Intensity measure of the registered observed images is defined as $$PI(o_r, o_f^T) = \int\int_{x,y} \sigma^2/[\sigma^2 + (o_d(x, y) - o_d(v, w))^2]dxdy,$$

wherein $o_d=o_r-o_f^T$ is a difference image, $o_d(x,y)$ denotes the intensity value of $o_d$ a pixel $(x,y)$, wherein $(v-x)^2+(w-y)^2<R^2$ define the region centered at $(x,y)$ with radius R, wherein $\sigma$ and R are pre-defined constants.

20. The computer readable program storage device of claim 11, the method further comprising repeating the steps of providing a pair of observed images, mapping a marginal intensity distribution of the observed pair to a marginal intensity distribution of the training pair, and estimating a set of parameters T that registers the observed pair of images until a difference in parameter values T between iterations is sufficiently small.

* * * * *